United States Patent
Son et al.

(10) Patent No.: US 11,242,429 B2
(45) Date of Patent: Feb. 8, 2022

(54) COMPOSITION FOR AUTOMOBILE INTERIOR SKIN, MANUFACTURING METHOD THEREOF, AND AUTOMOBILE INTERIOR SKIN MANUFACTURED USING THE SAME

(71) Applicants: HYUNDAI MOBIS CO., LTD., Seoul (KR); DONGSUNG CORPORATION, Busan (KR); HANWHA Q CELLS & ADVANCED MATERIALS CORPORATION, Sejong-si (KR)

(72) Inventors: Chang Wan Son, Yongin-si (KR); Dae Young Kwon, Ulsan (KR); Jae Chan Lee, Busan (KR); Hoon Jeong Kim, Sejong-si (KR); Gyu Min Lee, Sejong-si (KR)

(73) Assignees: Hyundai Mobis Co., Ltd., Seoul (KR); DONGSUNG CORPORATION, Busan (KR); HANWHA Q CELLS & ADVANCED MATERIALS CORPORATION, Seiona-si (KR)

( * ) Notice: Subject to any disclaimer, the term of this patent is extended or adjusted under 35 U.S.C. 154(b) by 119 days.

(21) Appl. No.: 16/736,030

(22) Filed: Jan. 7, 2020

(65) Prior Publication Data
US 2020/0216602 A1    Jul. 9, 2020

(30) Foreign Application Priority Data
Jan. 8, 2019 (KR) .......... 10-2019-0002210

(51) Int. Cl.
*B29C 41/34* (2006.01)
*B29C 41/22* (2006.01)
(Continued)

(52) U.S. Cl.
CPC ............ *C08G 18/758* (2013.01); *B29C 41/18* (2013.01); *B29C 41/22* (2013.01); *B29C 41/34* (2013.01);
(Continued)

(58) Field of Classification Search
CPC .......... B29C 41/34; B29C 41/22; B29C 41/18
See application file for complete search history.

(56) References Cited

U.S. PATENT DOCUMENTS 5,051,310 A     9/1991  Horn et al.
2006/0287419 A1*  12/2006  Park ..................... C08G 18/664
                                                        524/277
2018/0291141 A1   10/2018  Yang et al.

FOREIGN PATENT DOCUMENTS

CN    106674471    5/2017
DE     3820704    12/1989
(Continued)

OTHER PUBLICATIONS

JP_2018115257-07-2018_English.*
(Continued)

*Primary Examiner* — Michael L Leonard
(74) *Attorney, Agent, or Firm* — H.C. Park & Associates, PLC

(57) ABSTRACT

A composition for an automotive interior skin, a method for manufacturing the same, and an automotive interior skin manufactured using the same. The composition for an automotive interior skin includes: 30 wt % to 70 wt % of a polyol compound; 5 wt % to 40 wt % of dicyclohexylmethane-4,4'-diisocyanate; and 5 wt % to 30 wt % of an aromatic glycol-based chain extender.

4 Claims, 4 Drawing Sheets

(51) Int. Cl.
  *B29C 41/18* (2006.01)
  *C08G 18/75* (2006.01)
  *C08G 18/42* (2006.01)
  *C08G 18/48* (2006.01)
  *C08G 18/44* (2006.01)
  *C08K 5/00* (2006.01)
  *C08G 18/32* (2006.01)
  *B29L 31/30* (2006.01)
  *B29K 75/00* (2006.01)

(52) U.S. Cl.
  CPC ..... *C08G 18/3215* (2013.01); *C08G 18/4252* (2013.01); *C08G 18/44* (2013.01); *C08G 18/48* (2013.01); *C08K 5/005* (2013.01); *B29K 2075/00* (2013.01); *B29L 2031/3014* (2013.01); *B29L 2031/3026* (2013.01)

(56) References Cited

FOREIGN PATENT DOCUMENTS

| | | | |
|---|---|---|---|
| DE | 112015007107 | | 8/2018 |
| JP | 2010209164 | A * | 9/2010 |
| JP | 2018115257 | A * | 7/2018 |
| KR | 10-2015-0135708 | | 12/2015 |

OTHER PUBLICATIONS

JP_2010209164_09-2010_English.*
Pelzl, et al., Plastics, Additives., Ullmann's Encyclopedia of Industrial Chemistry, 2018, pp. 1-56, Germany.
Chinese Office Action dated Sep. 8, 2021, in Chinese Patent Office for Chinese Patent No. 202010016786.1.

* cited by examiner

Example 1

COMPOSITION FOR AUTOMOBILE INTERIOR SKIN, MANUFACTURING METHOD THEREOF, AND AUTOMOBILE INTERIOR SKIN MANUFACTURED USING THE SAME

CROSS-REFERENCE TO RELATED APPLICATION

This application claims the benefit from and the benefit of Korean Patent Application No. 10-2019-0002210, filed on Jan. 8, 2019, which is hereby incorporated by reference for all purposes as if set forth herein.

BACKGROUND

Field

Exemplary embodiments relate to a composition for an automotive interior skin, a method for manufacturing the same, and an automotive interior skin manufactured using the same.

Discussion of the Background

A crash pad is also called an instrument panel, and is an automotive interior part and is attached to the lower end of the front glass of the driver's seat. An airbag is mounted in the crash pad. The airbag functions to protect the occupant's life from external shock by deployment through the seam line of the crash pad to the outside when a crash occurs. Thus, the airbag is a very important impart in terms of design, convenience and stability.

FIG. 1 illustrates a general automotive crash pad, and FIG. 2 illustrates the section of a general crash pad. Referring to FIGS. 1 and 2, a crash pad 100 includes a core layer 1, a foam layer 2 formed on the surface of the core layer 1, and a skin layer 3 formed on the foam layer 2. Here, the skin layer 3 is formed using the material and coating agent that may have the appearance and feel of real leather to emphasize design and sensitivity. In addition, on the skin layer 3, a scoring 4 for airbag deployment may be formed by skin scoring. The skin scoring is performed using processes such as laser, hot knife, ultrasonic knife, cold knife and milling processes.

However, when the skin scoring process is applied, problems arise such as an increase in process costs, an increase in process cycle time, an increase in the labor cost and work time for controlling a material remaining after scoring, and exposure of the seam line on the surface of the crash pad. To solve these problems caused by skin scoring, a process that omits skin scoring by applying a structure, covering a vacuum formed fabric, to the plastic core layer has been applied. However, there is no technology for eliminating the skin scoring from the crash pad composed of the skin layer, the foam layer and the plastic core layer.

Meanwhile, in recent years, a crash pad skin has been manufactured using a powder slush molding (PSM) process. The powder slush molding process may provide a softer texture and a clearer embossing than a vacuum molding process, and thus is used to manufacture skins for interior parts which are used in medium-sized cars or luxury cars.

Background arts related to the present disclosure include Korean Patent Application Publication No. 2015-0135708 (published on Dec. 3, 2015; entitled "Method for Manufacturing Crash Pad Skin).

The above information disclosed in this Background section is only for enhancement of understanding of the background of the invention and, therefore, it may contain information that does not constitute prior art.

SUMMARY

An object of the present disclosure is to provide a composition for an automotive interior skin having excellent lightweight and mechanical properties.

Another object of the present disclosure is to provide a composition for an automotive interior skin having excellent sensitivity properties such as appearance and touch.

Still another object of the present disclosure is to provide a composition for an automotive interior skin having excellent economic efficiency due to process simplification and cost reduction.

Yet another object of the present disclosure is to provide a composition for an automotive interior skin having excellent miscibility and moldability.

Still yet another object of the present disclosure is to provide a composition for an automotive interior skin having excellent airbag deployment performance.

A further object of the present disclosure is to provide a method for manufacturing the composition for an automotive interior skin.

Another further object of the present disclosure is to provide an automotive is interior skin manufactured using the composition for an automotive interior skin.

Still another further object of the present disclosure is to provide an automotive interior part including the automotive interior skin.

One aspect of the present disclosure is directed to a composition for an automotive interior skin. The composition for an automotive interior skin includes: 30 wt % to 70 wt % of a polyol compound; 5 wt % to 40 wt % of dicyclohexylmethane-4,4'-diisocyanate; and 5 wt % to 30 wt % of an aromatic glycol-based chain extender.

In one embodiment, the polyol compound has a number-average molecular weight (Mn) of 500 g/mol to 6,000 g/mol, and the polyol compound may include one or more of polyester polyol, polyether polyol, polycarbonate diol, and ether-containing polyester polyol.

In one embodiment, the dicyclohexylmethane-4,4'-diisocyanate and the aromatic glycol-based chain extender may be included at a weight ratio of 1:1 to 5:1.

In one embodiment, the aromatic glycol-based chain extender may include hydroxyquinone bis(2-hydroxyethyl) ether.

In one embodiment, the composition for an automotive interior skin may further include one or more of 0.1 wt % to 5 wt % of a hindered amine light stabilizer, and 0.05 wt % to 5 wt % of an anti-hydrolysis agent.

In one embodiment, the hindered amine light stabilizer may have a number-average molecular weight of 1,000 g/mol to 5,000 g/mol, and the anti-hydrolysis agent may have a number-average molecular weight of 10,000 g/mol to 50,000 g/mol.

In one embodiment, the composition for an automotive interior skin may have an average particle diameter of 140 μm to 300 μm and an apparent specific gravity of 0.3 g/cm$^3$ or more.

In one embodiment, the composition for an automotive interior skin may have a melt flow index of 20 g/10 min to 100 g/10 min as measured at 185° C. under a load of 2.16 kg in accordance with ASTM D 1238, and a shore A hardness of 65 to 90 as measured in accordance with ASTM D 2240.

In one embodiment, the composition for an automotive interior skin may have a tensile strength of 3 MPa to 20 MPa as measured in accordance with ASTM D638, and an elongation of 200% to 600% as measured accordance with ASTM D638.

Another aspect of the present disclosure is directed to a method for manufacturing the composition for an automotive interior skin. In one embodiment, the method for manufacturing the composition for an automotive interior skin includes the steps of: producing an intermediate molded body by kneading the composition for an automotive interior skin; producing a Pulverized Material by drying and pulverizing the intermediate molded body at −60° C. or below; subjecting the Pulverized Material to first stirring at 80° C. or above; and subjecting the stirred Pulverized Material to second stirring.

In one embodiment, the intermediate molded body may be dried at a temperature of −60° C. to −190° C.

In one embodiment, after the step of producing the Pulverized Material, 0.05 parts by weight to 5 parts by weight of a drying agent may be added to 100 parts by weight of the Pulverized Material, and first stirring may be performed.

In one embodiment, the first stirring may be performed by stirring the Pulverized Material at 500 rpm to 1,500 rpm and at 80° C. to 110° C., and the second stirring may be performed by stirring the stirred Pulverized Material at 200 rpm to 1,000 rpm.

Still another aspect of the present disclosure is directed to an automotive interior skin manufactured using the composition for an automotive interior skin.

Yet another aspect of the present disclosure is directed to an automotive interior part including a skin layer formed of the automotive interior skin or the composition for an automotive interior skin.

In one embodiment, the automotive interior part may be a crash pad, a door trim, a floor console or an arm rest.

In another embodiment, the automotive interior part includes: a core layer; a foam layer formed on the surface of the core layer; and a skin layer formed on the surface of the foam layer, wherein the skin layer is formed using the composition for an automotive interior skin.

In one embodiment, the skin layer may be formed by powder slush molding using the composition for an automotive interior skin.

In one embodiment, the skin layer and the core layer may not be subjected to scoring.

The composition for an automotive interior skin according to the present disclosure, may have excellent powder flowability, miscibility and moldability when manufactured in a powder form, and an automotive interior skin manufactured using the composition for an automotive interior skin may have excellent sensitivity properties such as appearance and touch, have excellent bonding strength between the foam layer and the skin layer, show excellent airbag deployment performance when an external shock occurs, have excellent lightweight and mechanical properties, and have excellent economic efficiency due to process simplification and cost reduction.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
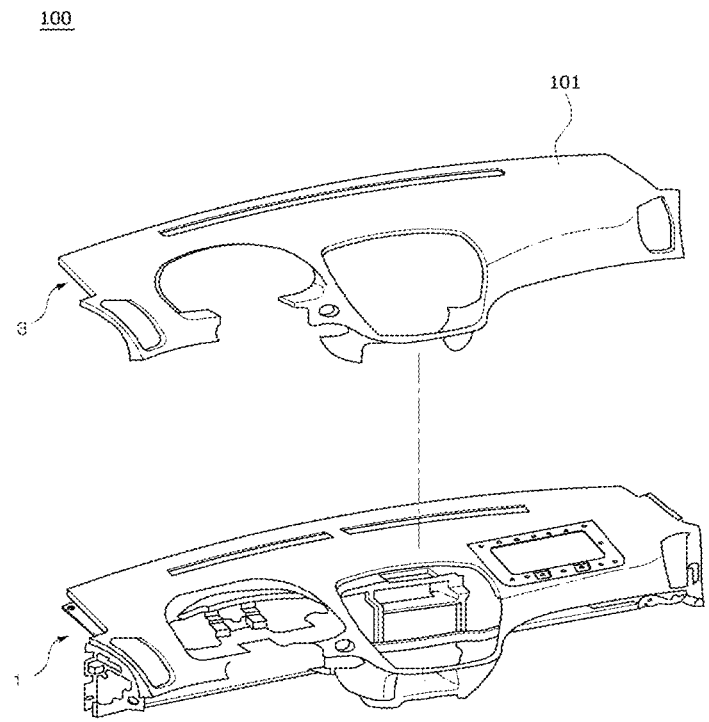
FIG. 1 illustrates a general automotive crash pad.
Figure 2:
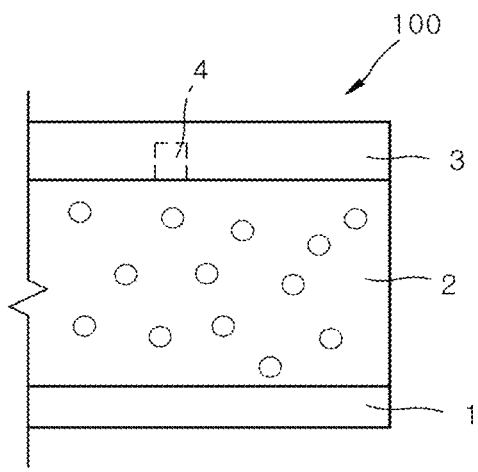
FIG. 2 illustrates the section of a general crash pad.

The invention is described more fully hereinafter with reference to the accompanying drawings, in which embodiments of the invention are shown. This invention is may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereinafter, exemplary embodiments of the present invention will be described in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The drawings are not necessarily to scale and in some instances, proportions may have been exaggerated in order to clearly illustrate features of the embodiments. Furthermore, although only a portion of a constituent element is also shown for convenience of explanation, any person skilled in the art will easily recognize the remaining portion of the element. Generally, the description of the drawings is made from the observer's viewpoint. When one element is referred to as being "on" or "under" another element, it not only refers to a case where the element is formed directly located "on" or "under" the other element but also a case where an additional element exists between these elements. Furthermore, any person skilled in the art will appreciate that the present invention may be embodied in various different forms without departing the technical spirit of the present invention. Throughout the drawings, the same reference numerals are used to designate substantially the same elements.

Composition for Automotive Interior Skin

One aspect of the present disclosure is directed to a composition for an automotive interior skin. The composition for an automotive interior skin includes: 30 wt % to 70 wt % of a polyol compound; 5 wt % to 40 wt % of dicyclohexylmethane-4,4'-diisocyanate; and 5 wt % to 30 wt % of an aromatic glycol-based chain extender.

Hereinafter, the components of the composition for an automotive interior skin will be described in more detail.

Polyol Compound

The polyol compound forms thermoplastic polyurethane or a thermoplastic polyurethane elastomer by reaction with a dicyclohexylmethane-4,4'-diisocyanate and a chain extender.

In one embodiment, the polyol compound has a number-average molecular weight (Mn) of 500 g/mol to 6,000 g/mol. Under this molecular weight condition, the automotive interior skin may have excellent chemical resistance and heat resistance.

For example, the polyol compound may include one or more of polyester polyol, polyether polyol, polycarbonate diol, and ether-containing polyester polyol, which have a number-average molecular weight (Mn) of 500 g/mol to 6,000 g/mol. For example, the polyester polyol may include polycaprolactone diol. For example, the polyol compound may include the ether-containing polyester polyol.

The ether-containing polyester polyol may be produced by a method including the steps of: heating a first mixture, including a multifunctional carboxylic acid compound, a multifunctional alcohol compound and polytetramethylene ether glycol, to a first heating temperature of 140° C. to 160° C. and maintaining the first mixture at the first heating temperature for 60 minutes to 120 minutes; heating the first mixture to a second heating temperature of 210° C. to 230° C. and maintaining the first mixture at the second heating temperature for 10 minutes to 120 minutes; and applying a vacuum level of 650 mmHg to 760 mmHg at the second heating temperature, and terminating the reaction when the acid value of the heated first mixture reaches 1 mgKOH/g or less.

In one embodiment, the produced ether-containing polyester polyol may have a hydroxyl value of 1 mgKOH/g to 250 mgKOH/g. In this hydroxyl value range, the components of the composition may have excellent reactivity and heat resistance. For example, the hydroxyl value may be 11.22 mgKOH/g to 224.11 mgKOH/g.

In one embodiment, the multifunctional carboxylic acid compound may include one or more of adipic acid, sbelic acid, abelic acid, azelic acid, sebacic acid, dodecandioic acid and trimeric acid.

In one embodiment, the multifunctional alcohol compound may include one or more of 1,4-butylene glycol, ethylene glycol, butane diol, hexane diol and trimethylol propane.

In one embodiment, the polytetramethylene ether glycol (PTMG) having a hydroxyl value of 50 mgKOH/g to 600 mgKOH/g may be used. If the hydroxyl value of the polytetramethylene ether glycol is lower than 50 mgKOH/g, a problem may arise in that the polytetramethylene ether glycol may not chemically bond into the polyester polyol molecule structure to be synthesized, due to its excessively high molecular weight. If the hydroxyl value of the polytetramethylene ether glycol is lower than is higher than 600 mgKOH/g, the polytetramethylene ether glycol may lower the crystallinity of the ether-containing polyester polyol to be synthesized, due to its excessively low molecular weight, resulting in the reduction in heat resistance and anti-aging performance caused by a reduction in the melting point after production of the thermoplastic polyurethane (TPU). For example, the hydroxyl value may be 56.1 mgKOH/g to 561 mgKOH/g.

In one embodiment, the polyol compound is included in an amount of 30 wt % to 70 wt % based on the total weight of the composition. If the polyol compound is included in an amount of less than 30 wt %, the viscosity of the composition may be excessively lowered, resulting in reduction in the miscibility and mechanical properties thereof, and if the polyol compound is included in an amount of more than 70 wt %, the miscibility and moldability of the composition may be reduced, and the elongation thereof may excessively increase, and thus when the automotive interior skin of the present disclosure is not subjected to a scoring process, an airbag may not deploy through the automotive interior skin of the present disclosure to the outside when an external shock occurs. For example, the polyol compound may be included in an amount of 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69 or 70 wt %.

Dicyclohexylmethane-4,4'-Diisocyanate

The dicyclohexylmethane-4,4'-diisocyanate may be included to serve as a curing agent. When the dicyclohexylmethane-4,4'-diisocyanate is applied, it is possible to lower the elongation of the automotive interior skin of the present disclosure compared to a conventional art while ensuring the tensile strength thereof, thus making airbag deployment possible without the scoring process. In addition, when the dicyclohexylmethane-4,4'-diisocyanate is applied, the skin composition of the present disclosure may be easily manufactured in a homogeneous powder form.

In one embodiment, the dicyclohexylmethane-4,4'-diisocyanate is included in an amount of 5 wt % to 40 wt % based on the total weight of the composition. If the dicyclohexylmethane-4,4'-diisocyanate is included in an amount of less than 5 wt %, the production of polyurethane by the reaction of the dicyclohexylmethane-4,4'-diisocyanate with a polyol may not be easy, and the mechanical strength of the automotive interior skin of the present disclosure may be reduced, and if the dicyclohexylmethane-4,4'-diisocyanate is included in an amount of more than 40 wt %, the melting viscosity of the composition may excessively increase, resulting in reduction in the miscibility and moldability of the composition. For example, the dicyclohexylmethane-4,4'-diisocyanate may be included in an amount of 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39 or 40 wt %.

Aromatic Glycol-Based Chain Extender

The aromatic glycol-based chain extender causes chain extension or crosslinking during the manufacture of the composition for an automotive interior skin according to the present disclosure, thus increasing the molecular weight of the composition, and improving the mechanical properties, heat resistance and chemical resistance of the composition, lowering the elongation of the composition compared to a conventional art, and making airbag development possible without the scoring process. In addition, the composition for an automotive interior skin according to the present disclosure may be easily manufactured in a homogeneous powder form.

In one embodiment, the aromatic glycol-based chain extender may include hydroxyquinone bis(2-hydroxyethyl) ether (HQEE). When the chain extender is applied, the composition of the present disclosure may have excellent moldability, and the automotive interior skin of the present disclosure may have a desired tensile strength and hardness while the elongation of the automotive interior skin is prevented from excessively increasing.

In one embodiment, the aromatic glycol-based chain extender is included in an amount of 5 wt % to 30 wt % based on the total weight of the composition. If the aromatic glycol-based chain extender is included in an amount of less than 5 wt %, the mechanical strength and heat resistance of the composition of the present disclosure may be reduced, and if the aromatic glycol-based chain extender is included in an amount of more than 30 wt %, the appearance of the automotive interior skin may deteriorate, and the elongation of the automotive interior skin may excessively increase, and thus an airbag may not deploy through the automotive interior skin of the present disclosure. For example, the aromatic glycol-based chain extender may be included in an amount of 5, 6, 7, 8, 9, 10, 11, 12, 13, 14, 15, 16, 17, 18, 19, 20, 21, 22, 23, 24, 25, 26, 27, 28, 29 or 30 wt %.

In one embodiment, the dicyclohexylmethane-4,4'-diisocyanate and the aromatic glycol-based chain extender may be included at a weight ratio of 1:1 to 5:1. When they are included at a weight ratio within this range, the composition of the present disclosure may have excellent mechanical properties, the elongation may be prevented from excessively increasing, and the composition may have excellent moldability. For example, the dicyclohexylmethane-4,4'-diisocyanate and the aromatic glycol-based chain extender may be included at a weight ratio of 1:1, 1.5:1, 2:1, 2.5:1, 3:1, 3.5:1, 4:1, 4.5:1 or 5:1.

Light Stabilizer

In one embodiment, the composition for an automotive interior skin may further include a hindered amine light stabilizer (HALS).

In one embodiment, the hindered amine light stabilizer (HALS) may include a polymeric hindered amine light stabilizer having a number-average molecular weight of 1,000 g/mol to 5,000 g/mol. When the hindered amine light stabilizer having a number-average molecular weight within this range is applied, the composition of the present disclosure may have excellent compatibility, light resistance, and long-term heat resistance and stability.

In one embodiment, the hindered amine light stabilizer may include poly[[6-(1,1,3,3-tetramethylbutyl)amino]-1,3,5-triazine-2,4-diyl][(2,2,6,6-tetramethyl-4-pyperidinyl)imino]-1,6-hexanediyl[(2,2,6,6-tetramethyl-4-pyperidinyl)imino].

In one embodiment, the hindered amine light stabilizer may be included in an amount of 0.1 wt % to 5 wt % based on the total weight of the composition. When the hindered amine light stabilizer is included in an amount within this range, the composition may have excellent compatibility and light resistance. For example, the hindered amine light stabilizer is included in an amount of 0.1, 0.2, 0.3, 0.4, 0.5, 0.6, 0.7, 0.8, 0.9, 1, 1.5, 2, 2.5, 3, 3.5, 4, 4.5 or 5 wt %.

Anti-Hydrolysis Agent

In one embodiment, the composition for an automotive interior skin may further include an anti-hydrolysis agent. For example, the composition may include a carbodiimide-based anti-hydrolysis agent. For example, it may include polycarbodiimide.

In one embodiment, the anti-hydrolysis agent may include a polymeric anti-hydrolysis agent having a number-average molecular weight of 10,000 g/mol to 50,000 g/mol. In this number-average molecular weight range, the composition may have excellent heat resistance, and physical properties may be prevented from deteriorating when manufacturing the composition of the present disclosure.

In one embodiment, the anti-hydrolysis agent may be included in an amount of 0.05 wt % to 5 wt % based on the total weight of the composition. When the anti-hydrolysis agent is included in an amount within this range, the composition may have excellent compatibility and anti-hydrolysis properties. For example, the anti-hydrolysis agent may be included in an amount of 0.05, 0.06, 0.07, 0.08, 0.09, 0.1, 0.2, 0.3, 0.4, 0.5, 0.6, 0.7, 0.8, 0.9, 1, 1.5, 2, 2.5, 3, 3.5, 4, 4.5 or 5 wt %.

In one embodiment, the light stabilizer and the anti-hydrolysis agent may be included at a weight ratio of 1:1 to 5:1. When they are included at a weight ratio within this range, unpredictable synergistic effects between the above-described components may occur, and thus the composition of the present disclosure may have excellent miscibility, mechanical properties, light resistance, heat resistance and anti-hydrolysis properties.

In one embodiment, the composition for an automotive interior skin may have an average particle diameter of 140 μm to 300 μm and an apparent specific gravity of 0.3 g/cm$^3$ or more. Under these average particle diameter and apparent specific gravity conditions, the composition may have excellent miscibility and moldability during powder slush molding. For example, the apparent specific gravity may be 0.3 g/cm$^3$ to 5 g/cm$^3$.

In one embodiment, the composition for an automotive interior skin may have a melt flow index of 20 g/10 min to 100 g/10 min as measured at 185° C. under a load of 2.16 kg in accordance with ASTM D 1238, and a shore A hardness of 65 to 90 as measured in accordance with ASTM D 2240. Under these conditions, the composition may have excellent miscibility and moldability during powder slush molding.

In one embodiment, the composition for an automotive interior skin may have a tensile strength of 3 MPa to 20 MPa as measured in accordance with ASTM D638, and an elongation at break of 200% to 600% as measured accordance with ASTM D638. Under these conditions, the composition may ensure an excellent tensile strength, and an airbag may easily deploy through the automotive interior skin of the present disclosure to the outside in the event of an external shock even when the automotive interior skin is not subjected to the scoring process. For example, the elongation may be 300% to 500%.

In one embodiment, the automotive interior skin manufactured using the composition may have a thickness of 0.5 mm or more. For example, the automotive interior skin may have a thickness of 0.5 mm to 0.8 mm and an elongation of 300% to 500%.

Method for Manufacturing Composition for Automotive Interior Skin

Figure 3:
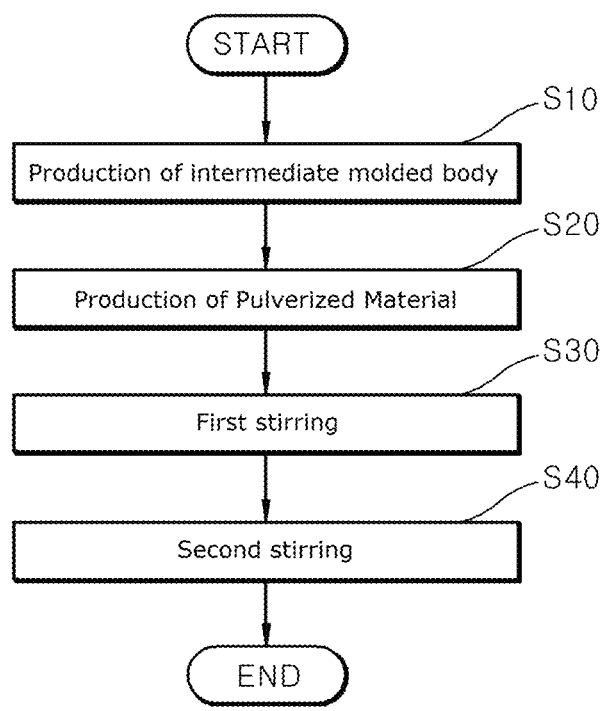
FIG. 3 shows a method for manufacturing a composition for an automotive interior skin according to one embodiment of the present disclosure.

Another aspect of the present disclosure is directed to a method for manufacturing the composition for an automotive interior skin. FIG. 3 shows a method for manufacturing a composition for an automotive interior skin according to one embodiment of the present disclosure. Referring to FIG. 3, the method for manufacturing the composition for an automotive interior skin includes the steps of: (S10) an intermediate molded body production step; (S20) a Pulverized Material production step; (S30) a first stirring step; and (S40) a second stirring step. More specifically, the method for manufacturing the composition for an automotive interior skin includes the steps of: (S10) producing an intermediate molded body by kneading the composition for the automotive interior skin; (S20) producing a Pulverized Material by drying and pulverizing the intermediate molded body at −60° C. or below; (S30) subjecting the Pulverized Material to first stirring at 80° C. or above; and (S40) subjecting the stirred Pulverized Material to second stirring.

Hereinafter, each step of the method for manufacturing the composition for an automotive interior skin will be described in detail.

(S10) Intermediate Molded Body Production Step

This step is a step of introducing the composition for an automotive interior skin into an extruder, followed by melting and kneading, thereby producing an intermediate molded body in a pellet form. For example, the intermediate molded body in a pellet form may be produced by introducing the composition for an automotive interior skin into an extruder, melting and kneading the composition at 130° C. to 250° C. in the extruder, extruding the kneaded composition from the extruder, cooling the extruded composition with water, and cutting the cooled composition. The components of the composition for an automotive interior skin and the contents of the components are the same as described above, and thus the detailed description thereof will be omitted herein.

(S20) Pulverized Material Production Step

This step is a step of drying and pulverizing the intermediated molded body at −60° C. or below, thereby producing a Pulverized Material. If the intermediate molded body is dried at a temperature higher than −60° C., the particle diameter of the Pulverized Material may be non-uniform, the moldability of the Pulverized Material during powder slush molding may be greatly reduced, and the appearance quality or mechanical properties of the manufactured automotive interior skin may be reduced. For example, the intermediate molded body may be dried at a temperature of −60° C. to −190° C. For example, the intermediated molded body may be dried at −60° C., −65° C., −70° C., −75° C., −80° C., −85° C., −90° C., −95° C., −100° C., −105° C., −110° C., −115° C., −120° C., −125° C., −130° C., −135° C., −140° C., −145° C., −150° C., −155° C., −160° C., −165° C., −170° C., −175° C., −180° C., −185° C. or −190° C.

(S30) First Stirring Step

This step is a step of subjecting the Pulverized Material to first stirring at 80° C. or above, thereby producing a stirred material. If the Pulverized Material is subjected to first stirring at a temperature lower than 80° C., the moldability during powder slush molding may be reduced due to insufficient drying. For example, the first stirring may be performed by introducing the Pulverized Material into a hot mixer and stirring the introduced Pulverized Material at a blade rotation speed of 500 rpm to 1,500 rpm and a temperature of 80° C. to 110° C. Under these first stirring conditions, a composition in a homogeneous powder form may be produced, and the moldability of the composition during powder slush molding may be excellent. For example, the Pulverized Material may be stirred at a temperature of 80, 81, 82, 83, 84, 85, 86, 87, 88, 89, 90, 91, 92, 93, 94, 95, 96, 97, 98, 99, 100, 101, 102, 103, 104, 105, 106, 107, 108, 109 or 110° C.

In one embodiment, after the step of producing the Pulverized Material, 0.05 parts by weight to 5 parts by weight of a drying agent may be added to 100 parts by weight of the Pulverized Material, and first stirring may be performed. Under the above-described conditions, the Pulverized Material may be easily dried.

(S40) Second Stirring Step

This step is a step of subjecting the stirred Pulverized Material to second stirring. In one embodiment, the second stirring may be performed by introducing the stirred material into a cooling mixer, and then stirring the introduced material at a blade rotation speed of 200 rpm to 1,000 rpm for 30 seconds to 300 seconds. Under these second stirring conditions, a composition in a homogeneous powder form may be produced, and the moldability of the composition during powder slush molding may be excellent. For example, in the second stirring, the Pulverized Material subjected to the first stirring may be cooled to room temperature.

In one embodiment, the manufactured composition for an automotive interior skin may have an average particle diameter of 140 μm to 200 μm and an apparent specific gravity of 0.3 g/cm$^3$ or more. When the composition is manufactured to have the above average particle diameter and apparent specific gravity, the composition may have excellent miscibility and moldability during powder slush molding. For example, the apparent specific gravity may be 0.3 g/cm$^3$ to 5 g/cm$^3$.

Automotive Interior Skin Characterized by being Manufactured Using Composition for Automotive Interior Skin Still another aspect of the present disclosure is directed to an automotive interior skin manufactured using the composition for an automotive interior skin. The composition for an automotive interior skin according to the present disclosure, may have excellent powder flowability, miscibility and moldability when manufactured in a powder form, and an automotive interior skin manufactured using the composition for an automotive interior skin may have excellent sensitivity properties such as appearance and feel, have excellent lightweight and mechanical properties, and have excellent economic efficiency due to process simplification and cost reduction.

Automotive Interior Part Including Automotive Interior Skin

Yet another aspect of the present disclosure is directed to an automotive interior part including the automotive interior skin or a skin layer formed of the composition for an automotive interior skin. In one embodiment, the automotive interior part may be a crash pad, a door trim, a floor console or an arm rest, but is not limited thereto.

Figure 4:
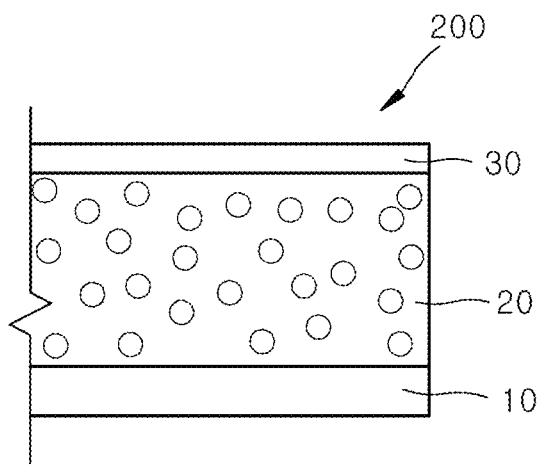
FIG. 4 shows the section of an automotive interior part including an automotive interior skin according to one embodiment of the present disclosure.

For example, the automotive interior part may be a crash pad. FIG. 4 shows the section of an automotive interior part including an automotive interior skin according to one embodiment of the present disclosure. Referring to FIG. 4, an automotive interior part (crash pad) 200 may include: a core layer 10; a foam layer 20 formed on the surface of the core layer 10; and a skin layer 30 formed on the surface of the foam layer 20, wherein the skin layer 30 may be formed using the composition for an automotive interior skin.

The core layer 10 forms the front of a driver's seat and a passenger's seat, and functions to protect an occupant from an external shock when a crash or rollover accident occurs. In addition, an insertion hole in which an airbag module is mounted may be formed, and a mounting part in which an air conditioner is provided may be formed. In one embodiment, the core layer may include: a matrix resin including polycarbonate-based resin and styrene-based resin; and an inorganic filler. The styrene-based resin may include acrylonitrile-butadiene-styrene (ABS) resin. In one embodiment, the matrix resin may include PC/ABS resin.

In one embodiment, the inorganic filler may include one or more of talc, whisker, glass fiber, carbon fiber, basalt fiber, and polymer fiber.

In one embodiment, the thickness of the core layer may be 1 mm to 6 mm. When the core layer is formed to have a thickness within the above range, the crash pad may have excellent shock resistance, and show excellent airbag deployment performance when an external shock occurs. For example, the thickness of the core layer may be 3 mm to 4 mm.

The foam layer 20 functions to ensure the physical properties of the crash pad, such as heat resistance, impact resistance and light resistance, and to impart increased feel, such as cushioning, and increased sensitivity to a vehicle occupant. For example, the thickness of the foam layer may be 3 mm to 8 mm. When the foam layer is formed to have a thickness within the above range, the crash pad may have excellent physical properties, such as heat resistance, shock resistance and light resistance, and show excellent airbag deployment performance when an external shock occurs. As another example, the thickness of the foam layer may be 3 mm to 5 mm.

For example, the skin layer 30 may be formed by powder slush molding using the composition for an automotive interior skin. In one embodiment, the powder slush molding may be performed according to a conventional method.

For example, the manufactured composition for an automotive interior skin is supplied onto the upper half of a mold heated to a temperature of 160° C. to 300° C., and the composition in a powder form is melted by heating for a predetermined time. At this time, non-melted powder is recovered. Thereafter, the mold may be cooled to form the skin layer.

In one embodiment, the skin layer may be formed to have a thickness of 0.5 mm to 5 mm. When the skin layer is formed to have a thickness within the above range, the skin layer may have excellent mechanical properties, and an airbag may easily deploy through the skin layer to the outside in the event of an external shock even when the skin layer is not subjected to a scoring process. For example, the thickness of the skin layer may be 0.5 mm to 1 mm.

In the present disclosure, the skin layer and the core layer may be formed without being subjected to the scoring process. The crash pad of the present disclosure may allow the airbag to easily deploy to the outside in the event of an external shock even when it is not subjected to the scoring process, and may show excellent productivity and economic efficiency due to process simplification and cost reduction.

In one embodiment, the bonding strength between the skin layer and the polyurethane foam layer may be 0.2 kgf/cm or higher as measured in accordance with Hyundai Motor MS Specification 256-29 (ISO 813 standard; 90° peeling method; peeling speed: 25 mm/min). Under this bonding strength condition, the crash pad may have excellent mechanical properties, and rapid deployment of the airbag may be possible and the incision shape may be good. For example, the bonding strength may be 0.2 kgf/cm to 0.6 kgf/cm.

Hereinafter, the configuration and effects of the present disclosure will be described in more detail with reference to preferred examples. However, these examples are presented as preferred examples of the present disclosure and may not be construed as limiting the scope of the present disclosure in any way. The contents that are not described herein can be sufficiently technically envisioned by those skilled in the art, and thus the description thereof will be omitted herein.

Preparation Example: Production of
Ether-Containing Polyester Polyol

A first mixture including 44 parts by weight of adipic acid, 20 parts by weight of 1,4-butyleneglycol and 36 parts by weight of polytetramethylene ether glycol having a hydroxyl value of 448.8 mgKOH/g was prepared. The first mixture was heated from room temperature to a first heating temperature of 150° C., and then maintained at the first heating temperature for 60 minutes. Next, the first mixture was heated from the first heating temperature to a second heating temperature of 230° C., and maintained at the second heating temperature for 30 minutes. Thereafter, a vacuum level of 720 mmHg was applied to the first mixture while the second heating temperature was maintained, and then the first mixture was reacted until the acid value of the first mixture reached 0.3 mgKOH/g or less, thereby producing an ether-containing polyester polyol having a water-of-condensation content of 12.3% and a hydroxyl value of 74.8 mgKOH/g.

EXAMPLES AND COMPARATIVE EXAMPLES

The components used in the Examples and Comparative Examples are as follows.

(A) Polyol compounds: (A1) The ether-containing polyester polyol produced in the Preparation Example was used. (A2) (A2) Polycarbonate diol was used.

(B) Curing agents: (B1) Dicyclohexylmethane-4,4'-diisocyanate was used. (B2) Toluene diisocyanate was used as a curing agent.

(C) Chain extenders: (C1) Hydroxyquinone bis(2-hydroxyethyl)ether was used as an aromatic glycol-based chain extender. (C2) 1,4-butyleneglycol was used as a chain extender.

(D) Light stabilizer: a hindered amine light stabilizer (Hostavin N30, manufactured by Clariant) having a number-average molecular weight of 1,000 to 5,000 g/mol was used.

(E) Anti-hydrolysis agent: a carbodiimide-based anti-hydrolysis agent (Stabilizer 9000, manufactured by Raschig) having a number-average molecular weight of 10,000 to 50,000 g/mol was used.

Manufacture of Composition for Automotive Interior Skin

Examples 1 and 2 and Comparative Examples 1 to 6

According to the components and contents shown in Table 1 below, the components were introduced into an extruder, and then melted and kneaded. The kneaded material was water-cooled and cut, thereby producing an intermediate molded body in a pellet form. Thereafter, the intermediate molded body was dried and pulverized at −100° C., thereby producing a Pulverized Material. Next, the Pulverized Material was introduced into a hot mixer, and subjected to first stirring at a blade rotation speed of 500 to 1,500 rpm and a temperature of 80 to 110° C. The stirred Pulverized Material was introduced into a cooling mixer, and subjected to second stirring at a blade rotation speed of 200 to 1,000 rpm for 30 to 300 seconds, thereby manufacturing a composition for an automotive interior skin in a powder form.

Comparative Example 7

A composition for an automotive interior skin was manufactured in the same manner as Example 1, except that a Pulverized Material was produced by drying and Pulverizing the intermediate molded body at −45° C.

TABLE 1

| Components (wt %) | | Examples | | Comparative Examples | | | | | | |
|---|---|---|---|---|---|---|---|---|---|---|
| | | 1 | 2 | 1 | 2 | 3 | 4 | 5 | 6 | 7 |
| (A) | | 30 | 50 | 28 | 75 | 30 | 30 | 30 | 30 | 30 |
| (B) | (B1) | 40 | 30 | 40 | 13 | 45 | 33 | — | 40 | 40 |
| | (B2) | — | — | — | — | — | — | 40 | — | — |
| (C) | (C1) | 28 | 18 | 30 | 10 | 23 | 35 | 28 | — | 28 |
| | (C2) | — | — | — | — | — | — | — | 28 | — |
| (D) | | 1 | 1.5 | 1 | 1.5 | 1 | 1 | 1 | 1 | 1 |
| (E) | | 1 | 0.5 | 1 | 0.5 | 1 | 1 | 1 | 1 | 1 |

The physical properties of the composition for an automotive interior skin, manufactured in each of Examples 1 and 2 and Comparative Examples 1 to 7, were evaluated as described below, and the results of the evaluation are shown in Table 2 below. In addition, the average particle diameter (μm) and apparent specific gravity (g/cm³) of each of the compositions were measured, and the results of the measurement are shown in Table 2 below.

(1) The melt index (g/10 min) was measured at 185° C. under a load of 2.16 kg in accordance with ASTM D 1238.

(2) The hardness (Shore A) was measured in accordance with ASTM D 2240.

(3) The tensile strength (MPa) and elongation at break (%) were measured in accordance with ASTM D638.

TABLE 2

| Properties | Examples | | Comparative Examples | | | | | | |
|---|---|---|---|---|---|---|---|---|---|
| | 1 | 2 | 1 | 2 | 3 | 4 | 5 | 6 | 7 |
| Average diameter (μm) | 150 | 200 | 148 | 210 | 188 | 140 | 188 | 168 | 340 |
| Apparent specific gravity (g/cm3) | 0.35 | 0.40 | 0.35 | 0.42 | 0.38 | 0.33 | 0.37 | 0.37 | 0.42 |
| Melt index (g/10 min) | 65 | 63 | 58 | 60 | 12 | 150 | 59 | 55 | 65 |
| Hardness (Shore A) | 83 | 80 | 85 | 68 | 83 | 83 | 78 | 76 | 83 |
| Tensile strength (MPa) | 10.5 | 11 | 11 | 11 | 18 | 6 | 18 | 17 | 11 |
| Elongation (%) | 430 | 450 | 460 | 620 | 680 | 220 | 810 | 730 | 440 |

Manufacture of Automotive Interior Part (Crash Pad)

Examples 1 and 2 and Comparative Examples 1 to 7

A 3-mm-thick to 4-mm-thick core layer including a matrix resin including polypropylene-based resin, a styrene-diene-based polymer and an inorganic filler, was prepared, and a 3-mm-thick to 5-mm-thick foam layer including polyurethane foam was formed on the surface of the core layer. Then, the composition for an automotive interior skin, manufactured in each of Examples 1 and 2 and Comparative Examples 1 to 7, was subjected to powder slush molding, thereby forming a 0.8-mm-thick skin layer on the surface of the foam layer. At this time, the core layer and the skin layer were formed without being subjected to a skin scoring process.

Example 3

An automotive interior part was manufactured in the same manner as Example 1, except that a 0.6-mm-thick skin layer was formed by powder slush molding using the composition for an automotive interior skin, manufactured in Example 1.

Example 4

An automotive interior part was manufactured in the same manner as Example 1, except that a 0.7-mm-thick skin layer was formed by powder slush molding using the composition for an automotive interior skin, manufactured in Example 1.

Comparative Example 8

An automotive interior part was manufactured in the same manner as Example 1, except that a 0.6-mm-thick skin layer was formed by powder slush molding using the composition for an automotive interior skin, manufactured in Comparative Example 2 (elongation: 620%).

Comparative Example 9

An automotive interior part was manufactured in the same manner as Example 1, except that a 1-mm-thick skin layer was formed by powder slush molding using the composition for an automotive interior skin, manufactured in Comparative Example 6 (elongation: 730%).

Comparative Example 10

An automotive interior part was manufactured in the same manner as Example 1, except that a 1-mm-thick skin layer was formed by powder slush molding using the composition for an automotive interior skin, manufactured in Comparative Example 7 (elongation: 440%).

(3) Test for Evaluation of Airbag Deployment Performance

In accordance with Hyundai Motor ES84500-13 (passenger airbag invisible door performance specification), a passenger airbag (PAB) module was mounted in the crash pad of each of Examples 1 to 4, and allowed to explode by applying an electrical signal to an inflator primer at room temperature (21° C.), low temperature (−35° C.) and high temperature (85° C.), and whether the airbag would move toward the seam line groove intentionally formed on the crash pad and would deploy through the seam line to the outside and whether crash pad pieces would scatter during airbag deployment were checked. The results of the checking were recorded as "pass (P)" and "fail (F)" and shown in Table 3 below. In addition, for each of the crash pads of Examples 1 to 4, the bonding strength (kgf/cm) between the skin layer and the foam layer was measured in accordance with Hyundai Motor MS specification 256-29 (ISO 813 standard; 90° peeling method; peeling speed: 25 mm/min), and the results of the measurement are shown in Table 3 below.

TABLE 3

| Classification | Examples | | | |
| --- | --- | --- | --- | --- |
|  | 1 | 2 | 3 | 4 |
| Room temperature (21° C.) | P | P | P | P |
| Low temperature (−35° C.) | P | P | P | P |
| High temperature (85° C.) | P | P | P | P |
| Interlayer bonding strength (kgf/cm) | 0.45 | 0.45 | 0.5 | 0.5 |

Figure 5:
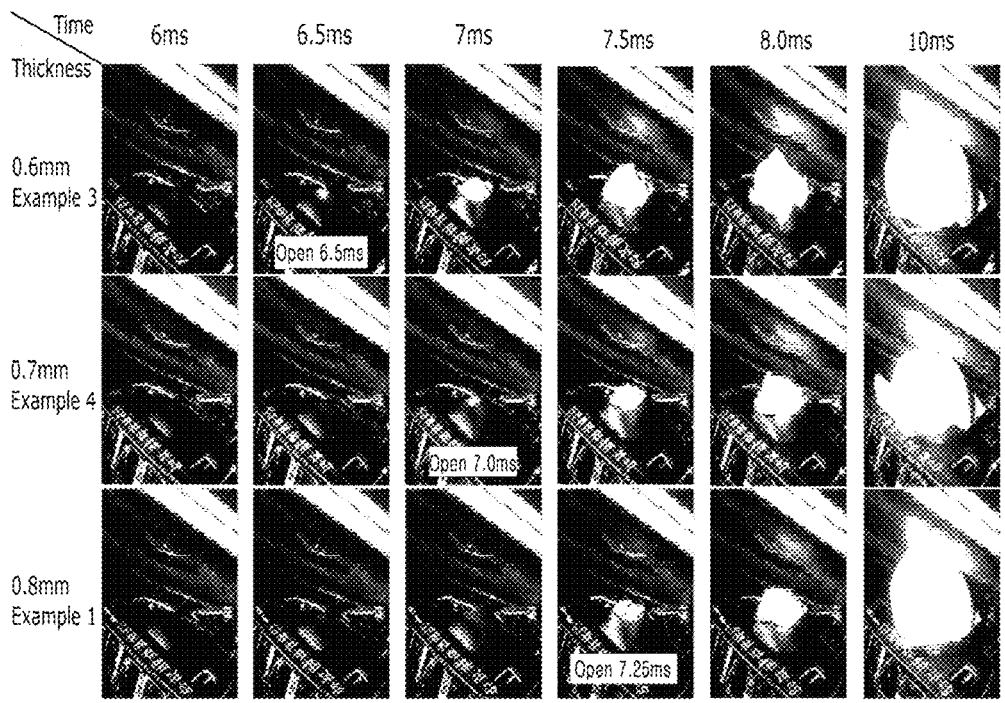
FIG. 5 depicts photographs showing the results of evaluating the airbag deployment performance of a crash pad according to Examples of the present disclosure.
Figure 6:
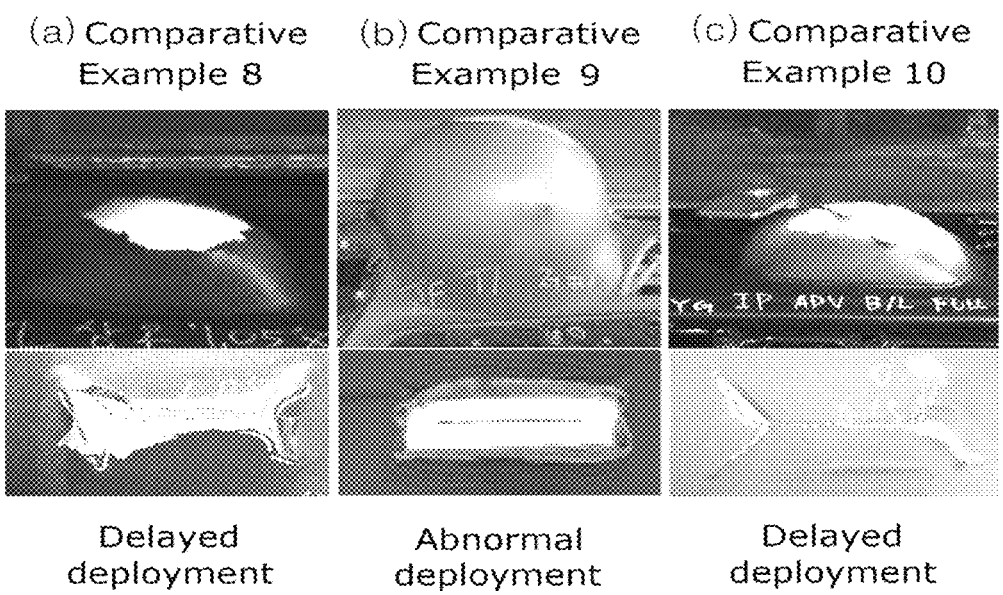
FIG. 6 depicts photographs showing the results of evaluating the airbag deployment performance of crash pads of Comparative Examples for the present disclosure.
Figure 7:
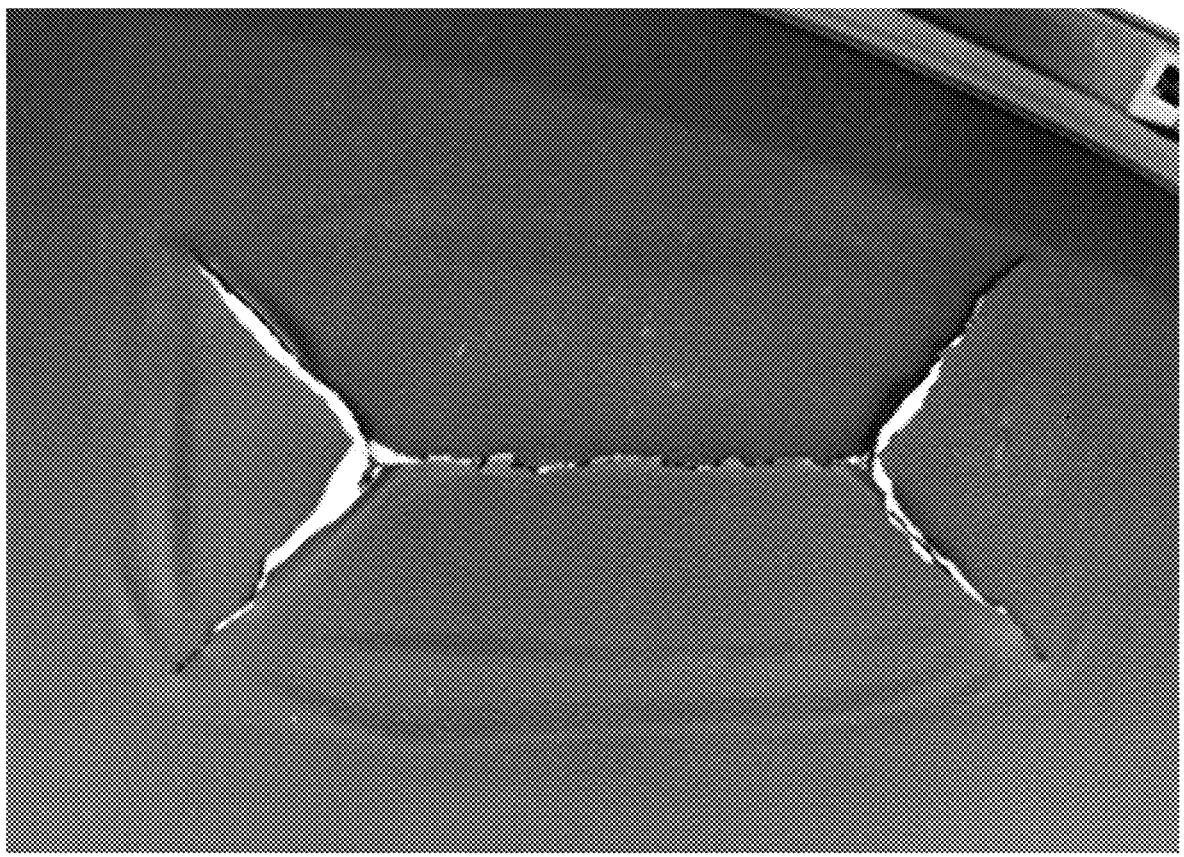
FIG. 7 is a photograph showing the shape of a door portion after airbag deployment from a crash pad according to an Example of the present disclosure.

FIG. 5 depicts photographs showing the results of evaluating the airbag deployment performance of the crash pads of Examples 1, 3 and 4 at room temperature, FIG. 6 depicts photographs showing the results of evaluating the airbag deployment performance of the crash pads of Comparative Examples 8 to 10 at room temperature, and FIG. 7 is a photograph showing the shape of a door portion after airbag deployment from the crash pad according to Example 1 of the present disclosure.

Referring to the results shown in FIGS. 5 to 7, it could be seen that in the case of each of Examples 1 to 4, in which the skin layer was formed using the composition for an automotive interior skin according to the present disclosure, rapid airbag deployment was possible even when a skin scoring process was not applied thereto, and the shape of the door portion of the crash pad after airbag deployment was also good. However, it could be seen that in the case of Comparative Examples 8 to 10 which did deviate from the conditions of the present disclosure, the airbag deployment performance deteriorated.

Through the results of the Examples, it could be seen that when the skin layer was formed using the composition for an automotive interior skin according to the present disclosure, the moldability and mechanical properties of the skin layer were excellent, the bonding strength between the skin layer and the foam layer was excellent, and thus the airbag deployed rapidly in the event of an external shock even when the skin scoring process was omitted, and the shape of the door portion after airbag deployment was also good.

So far, the present disclosure has been described with reference to the embodiments. Those skilled in the art will appreciate that the present disclosure can be implemented in modified forms without departing from the essential features of the present disclosure. Therefore, the disclosed embodiments should be considered in descriptive sense only and not for purposes of limitation. Therefore, the scope of the present disclosure is defined not by the detailed description of the present disclosure but by the appended claims, and all modifications within a range equivalent to the scope of the appended claims should be construed as being included in the present disclosure.

What is claimed is:

1. A method for manufacturing a composition for an automotive interior skin, comprising the steps of:
   producing an intermediate molded body by kneading the composition for an automotive interior skin, comprising:
   30 wt % to 70 wt % of a polyol component;
   5 wt % to 40 wt % of dicyclohexylmethane-4,4'diisocyanate; and
   5 wt % to 30 wt % of an aromatic glycol-based chain extender;
   producing a Pulverized Material by drying and Pulverizing the intermediate molded body at −60° C. or below;
   subjecting the Pulverized Material to first stirring at 80° C. or above; and
   subjecting the stirred Pulverized Material to second stirring.

2. The method of claim 1, wherein the intermediate molded body is dried at a temperature of −60° C. to −190° C.

3. The method of claim 1, wherein, after the step of producing the Pulverized Material, 0.05 parts by weight to 5 parts by weight of a drying agent is added to 100 parts by weight of the Pulverized Material, and the first stirring is performed.

4. The method of claim 1, wherein the first stirring is performed by stirring the Pulverized Material at 500 rpm to 1,500 rpm and at 80° C. to 110° C., and the second stirring is performed by stirring the stirred Pulverized Material at 200 rpm to 1,000 rpm.

* * * * *